United States Patent

Sato et al.

[11] Patent Number: 5,952,041
[45] Date of Patent: Sep. 14, 1999

[54] COMBINED READ/WRITE THIN FILM MAGNETIC HEAD AND ITS MANUFACTURING METHOD

[75] Inventors: Kiyoshi Sato; Naohiro Ishibashi, both of Niigata-ken, Japan

[73] Assignee: Alps Electric Co., Ltd., Japan

[21] Appl. No.: 09/103,475

[22] Filed: Jun. 24, 1998

Related U.S. Application Data

[62] Division of application No. 08/918,663, Aug. 22, 1997, Pat. No. 5,846,294.

[30] Foreign Application Priority Data

Sep. 10, 1996 [JP] Japan .................................. 8-239404

[51] Int. Cl.⁶ ...................................................... B05D 5/12
[52] U.S. Cl. ........................ 427/129; 427/130; 29/603.01
[58] Field of Search ........................ 29/603.01; 360/113, 360/122, 123, 126; 427/129, 130

[56] References Cited

U.S. PATENT DOCUMENTS

| | | |
|---|---|---|
| 3,908,194 | 9/1975 | Romankiw . |
| 4,855,854 | 8/1989 | Wada et al. . |
| 5,068,959 | 12/1991 | Sidman ..................................... 29/603 |
| 5,264,980 | 11/1993 | Mowry et al. . |
| 5,435,053 | 7/1995 | Krounbi et al. . |
| 5,486,968 | 1/1996 | Lee et al. . |
| 5,493,464 | 2/1996 | Koshikawa . |
| 5,530,609 | 6/1996 | Koga et al. . |

Primary Examiner—Brian K. Talbot
Attorney, Agent, or Firm—Brinks Hofer Gilson & Lione

[57] ABSTRACT

A combined read/write thin film magnetic head comprises an upper-core layer formed on a lower-core layer through an insulating layer, a magnetic gap of a nonmagnetic material disposed between one end of the upper-core layer and the lower-core layer, the other end of the upper-core layer and the lower-core layer being magnetically connected to each other, a thin coil layer provided between the lower-core layer and the upper-core layer so as to surround the magnetically connected section, and an organic resin layer, provided beside both sides of the lower-core layer, having substantially the same thickness as the lower-core layer. The coil layer is formed on the core lower-core layer and the organic resin layer through an insulating layer.

1 Claim, 7 Drawing Sheets

5,952,041

COMBINED READ/WRITE THIN FILM MAGNETIC HEAD AND ITS MANUFACTURING METHOD

This application is a division of Ser. No. 08/918,663, filed Aug. 22, 1997 now U.S. Pat. No. 5,846,294, which is hereby incorporated by reference in its entirety.

BACKGROUND OF THE INVENTION

1. Field of the Invention

The present invention relates to combined read/write thin film magnetic heads used in floating-type magnetic heads and the like. In particular, the present invention relates to a combined read/write thin film magnetic head in which a flat layer is provided on a lower core layer in order to readily form a coil layer.

2. Description of the Related Art

A combined read/write thin film magnetic head shown in FIG. 7 includes a reading head having a magnetoresistive element 11 provided on a lower-shield layer 9 at a trailing side face 15b of a slider 15, and an inductive-type magnetic head h2 for writing deposited thereon. FIG. 6 is an enlarged cross-sectional view of the inductive-type magnetic head h2 and is taken along sectional line VI—VI of FIG. 7.

The inductive-type magnetic head h2 shown in FIG. 6 is provided with a lower-core layer 21 composed of a magnetic material having high permeability, such as a Fe—Ni alloy (permalloy). The lower-core layer 21 also acts as an upper-shield layer of the reading head having the magnetoresistive element 11. A gap layer (a nonmagnetic layer) 22 composed of aluminum oxide ($Al_2O_3$) or the like is formed on the lower-core layer 21 and its circumference. An insulating layer (a resist layer) 23 composed of an organic insulating material is formed on the gap layer 22, and a coil layer 24 is spirally formed thereon as follows. A resist material is applied onto the insulating layer 23, exposed with a pattern for the coil layer, and developed, and the coil layer 24 is plated on the pattern using a low-resistivity material such as Au or Cu.

An insulating layer (a resist layer) 25 composed of an organic insulating material is formed on the coil layer 24, and an upper-core layer 26 composed of a magnetic material having high permeability, such as a Fe—Ni alloy (permalloy), is formed on the insulating layer 25. As shown in FIG. 7, the front end 26a of the upper-core layer 26 faces the lower-core layer 21 through the gap layer 22 having a magnetic gap G1, and the base end 26b of the upper-core layer 26 is magnetically connected to the lower-core layer 21. A protective film 27 composed of an insulating material, such as aluminum oxide, is formed on the upper-core layer 26.

As shown in FIG. 6, the length Lb of the region in which the lower-core layer 21 is formed is remarkably larger than the length La of the region in which the coil layer 24 is formed. The flat surface, formed on the lower-core layer 21, of the insulating layer 23 therefore has a length Lc sufficient to provide a flat region for forming the coil layer 24. As a result, the coil layer 24 is stably formed on the wide flat region above the lower-core layer 21 and defects of the coil layer 24 will be barely formed.

A recording current led to the coil layer 24 in the inductive-type magnetic head h2 induces a recording magnetic field in the lower-core layer 21 and the upper-core layer 26. Magnetic signals are recorded on a recording medium such as a hard disk by means of a leakage magnetic field between the lower-core layer 24 and the front end 26 of the upper-core layer 26 at the magnetic gap G1.

The total inductance of the inductive-type magnetic head h2 must be lower than a given critical value in order to achieve high density recording by means of high recording frequency. A decreased inductance can decrease the impedance and the time constant of the inductive-type magnetic head h2 in view of the circuit and improves high frequency recording characteristics. In the inductive-type magnetic head h2 shown in FIGS. 6 and 7, however, the lower-core layer 21 has a large inductance, because it has a large volume. A decrease in the total inductance in the inductive-type magnetic head h2 in response to high frequency recording therefore should be achieved by decreasing the inductance of the coil layer 24 by means of reduction of coil turns. The reduction of the coil turns, however, causes a decreased intensity of the recording magnetic field and is not capable of writing by a low electric power.

FIG. 8A is an enlarged cross-sectional view of a magnetic head, in which the length lb of the lower-core layer 21 is merely decreased and is smaller than the length la of the coil layer 24 for the purpose of the reduction of the inductance. In this case, the coil layer 24 is formed over a range larger than the lower-coil layer 24. It therefore is also formed just above bumps 21 at both ends of the lower-coil layer 24. Since the insulating layer 23 has slanted surfaces on the bumps 21, the coil layer 24 also has slanted surfaces above the bumps 21. In the step forming the coil layer 24, a resist material is applied onto the insulating layer 23 and a resist pattern 24a for the coil layer 24 is exposed through a mask. The exposed light is randomly scattered inside the resist material on the slanted surfaces of the insulating layer 23. As a result, the resist pattern 24a will have some defects 24a' on the slanted surfaces due to unsatisfactory patterning. Short-circuiting of the coil layer 24 based on the resist pattern 24a will therefore readily occur.

FIG. 9 is a cross-sectional view of an improved magnetic head, in which the lower-core layer 21 has a small length and the surface of the insulating layer 23 under the coil layer 24 is flat.

In the improvement, the region of the lower-core layer 21 is considerably smaller than the region of the coil layer 24, and a plating layer 28 composed of a nonmagnetic material such as copper is formed beside both sides of the lower-coil layer 21 so that these two layers have the same thickness. The gap layer 22 and the insulating layer 23 are formed thereon. Since the plating layer 28 having the same thickness as the lower-core layer 21 is formed beside both sides of the lower-core layer 21, the insulating layer has a flat surface and thus a coil having no defects can be readily formed.

In practical inductive-type magnetic heads h2, however, since the thicknesses of the gap layer 22 and the insulating layer 23 are small, short-circuiting will occur between the coil layer 24 and the conductive plating layer 28 due to defects, such as pin holes, in the gap layer 22 and the insulating layer 23. In inductive-type magnetic heads for high density recording, the thickness of the gap layer 22 which determines the gap length between the lower-core layer 21 and the upper-core layer 26 is too small to prevent short-circuiting due to layer defects.

Another type of magnetic head uses a nonmagnetic oxide, such as glass, $SiO_2$ or $Al_2O_3$, as the layer 28 at both ends of the lower-core layer 28 in FIG. 9, in which the nonmagnetic oxide layer 28 is formed on the substrate and the lower core layer 21, as shown in FIG. 10A, and the nonmagnetic oxide layer 28 formed on the lower-core layer 21 is removed by grinding to equalize of the level of the lower-core layer 21 and the level of the nonmagnetic oxide layer 28 as shown in FIG. 9. If the nonmagnetic oxide layer 28 is excessively ground, the lower-core layer 21 will be also ground and the magnetic characteristics of the lower-core layer 28 will deteriorate due to stress during grinding. If the nonmagnetic oxide layer 28 is left on the lower-magnetic layer 21, the head characteristics change due to the residual nonmagnetic oxide layer 28 under the gap layer 22, as shown in FIG. 10B.

SUMMARY OF THE INVENTION

It is an object of the present invention to provide a combined read/write thin film magnetic head in which a layer formed under a coil layer has a flat surface.

It is another object of the present invention to provide a method for manufacturing the combined read/write thin film magnetic head capable of secure and simple formation of the flat surface.

In accordance with the present invention, a combined read/write thin film magnetic head comprises an upper-core layer formed on a lower-core layer through an insulating layer, a magnetic gap of a nonmagnetic material disposed between one end of the upper-core layer and the lower-core layer, the other end of the upper-core layer and the lower-core layer being magnetically connected to each other, a thin coil layer provided between the lower-core layer and the upper-core layer so as to surround the magnetically connected section, and an organic resin layer, provided beside both sides of the lower-core layer, having substantially the same thickness as the lower-core layer, wherein the coil layer is formed on the core lower-core layer and the organic resin layer through an insulating layer.

Preferably, the organic resin layer is formed of an ultraviolet-curing resin and a gap is formed between the lower-core layer and the organic resin layer.

In accordance with a second aspect of the present invention, a method for manufacturing a combined read/write thin film magnetic head comprises the steps of: forming a lower-core layer having a given area using a magnetic material, forming an organic resin layer on and around the lower-core layer, removing the organic resin layer overlapping with the lower-core layer, forming an insulating layer on the lower-core layer and the organic resin layer, forming a coil layer on the region in which the lower-core layer and the organic resin layer are formed on the insulating layer, forming an insulating layer on the coil layer, and forming an upper-core layer on the insulating layer, one end of the upper-core layer facing the lower-core layer through a nonmagnetic layer and the other end of the upper-core layer being magnetically connected to the lower-core layer.

Preferably, the organic resin layer is formed is formed with an ultraviolet-curing resin on and around the lower-core layer, the organic resin layer on the lower layer is removed by exposing and developing steps so as to form a gap between the lower core layer and the organic resin layer, and the residual organic resin layer is cured by ultraviolet rays.

DESCRIPTION OF THE PREFERRED EMBODIMENTS

The present invention will now be described with reference to the drawings.

Figure 1:
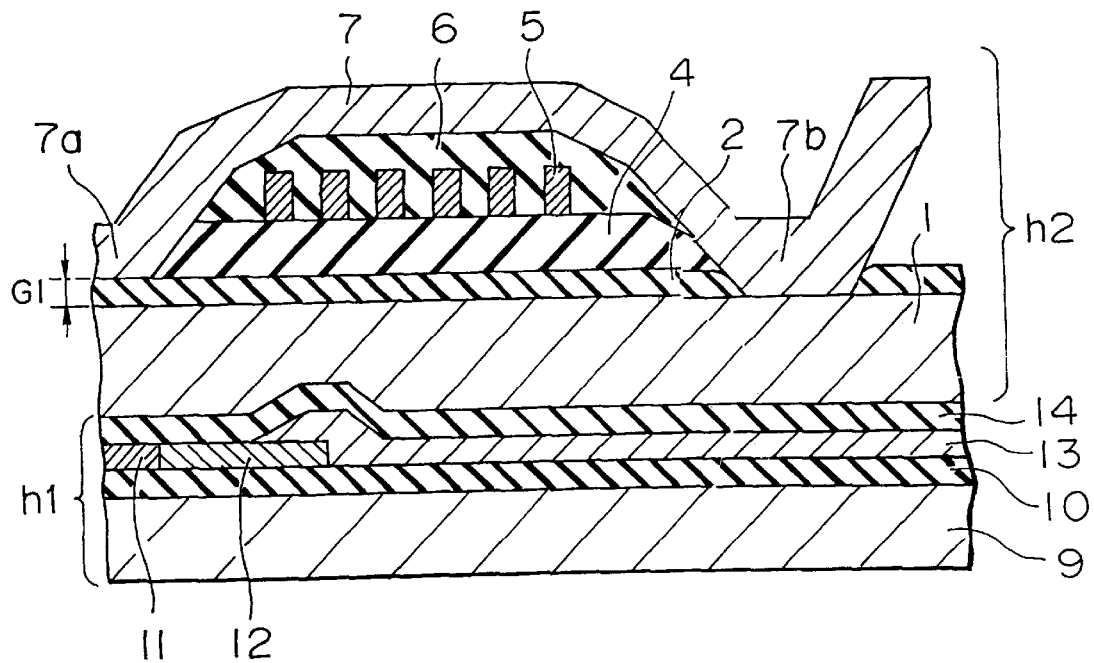
FIG. 1 is an enlarged cross-sectional view of a first combined read/write thin film magnetic head in accordance with the present invention, and taken along sectional line I—I of FIG. 4.
Figure 4:
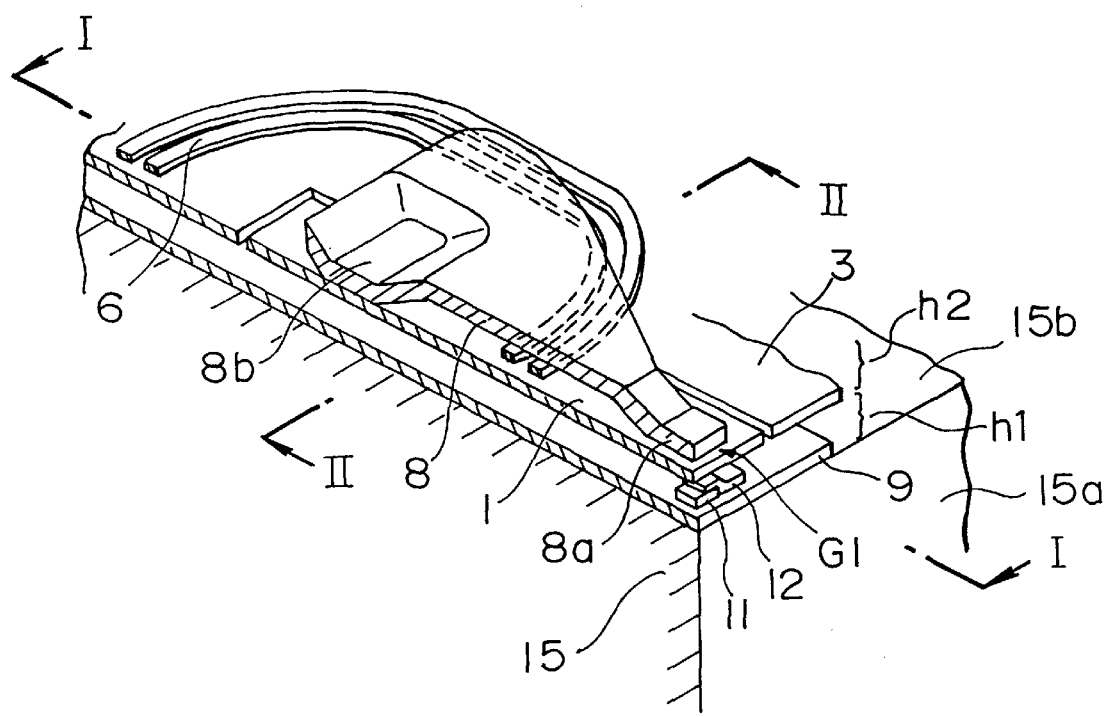
FIG. 4 is an isometric view, partly in section, of the first combined read/write thin film magnetic head in accordance with the present invention.

FIG. 1 is a fragmentary longitudinal cross-sectional view of a first combined read/write thin film magnetic head in accordance with the present invention, and is taken along sectional line I—I of FIG. 4.

The combined read/write thin film magnetic head shown in FIGS. 1 and 4 is mounted to a slider 15 of a floating-type magnetic head facing a recording medium such as a hard disk, and a reading head h1 and an inductive-type writing head h2 are stacked beside the trailing side face 15b of the slider 15.

The reading head hi detects a leakage magnetic flux from a recording medium, e.g. a hard disk, by means of the magnetoresistance effect and reads magnetic signals. The reading head h1 includes a lower-shield layer 9, which is composed of sendust (a Fe—Al—Si alloy) or permalloy (a Fe—Ni alloy) and formed beside a trailing side face 15b of a slider 15 by sputtering, and a lower-gap layer 10, provided thereon, formed of a nonmagnetic material, e.g. aluminum oxide ($Al_2O_3$) or $SiO_2$. A magnetoresistive element 11 is deposited on the lower-gap layer 10. The magnetoresistive element 11 has a triplet structure consisting of, from the bottom, a SAL (soft adjacent layer) composed of a Co—Zr—Mo or Fe—Ni—Mo alloy, a nonmagnetic SHUNT layer composed of, for example, Ta, and a MR layer (magnetoresistive layer) composed of a Fe—Ni alloy.

Beside both sides of the magnetoresistive element 11, a hard bias layer 12, which conducts a bias magnetic field to the MR layer, and a lead layer 13, which is composed of tungsten (W) or copper (Cu) and leads a sensing current to the MR layer, are formed. An upper-gap layer 14 composed of aluminum oxide or $SiO_2$ is deposited thereon.

Figure 2:
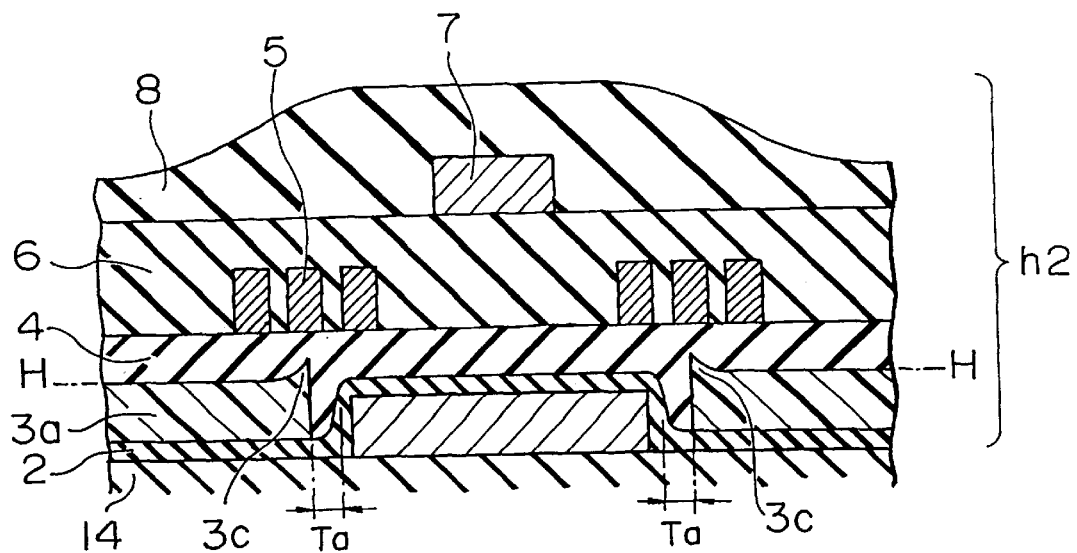
FIG. 2 is an enlarged cross-sectional view of an inductive-type magnetic head section of the first combined read/write thin film magnetic head in accordance with the present invention, and taken along sectional line II—II of FIG. 4.

FIG. 2 is a cross-sectional view taken from cross-section line II—II of the inductive-type magnetic head h2 in FIG. 4. In the inductive-type magnetic head h2, a recording current led to a coil layer 5 induces a recording magnetic field in a lower-core layer 1 and an upper-core layer 7. The lower-core layer 1 and the front end 7a of the upper-core layer 7 are connected to each other through a gap layer (a nonmagnetic layer) 2 composed of aluminum oxide or $SiO_2$, and magnetic signals are recorded on a recording medium, e.g. a hard disk, by means of a fringing magnetic field between the lower-core layer 1 and the front end 7a of the upper-core layer 7 at the magnetic gap. In the inductive-type magnetic head h2, the magnetic gap length G1 is determined by the thickness of the gap layer 2, and the magnetic gap length G1 must be formed as small as possible in order to achieve high density recording. The lower-core layer 1 also acts as an upper-shield layer of the reading head h1.

The lower-core layer 1 is formed by plating a Fe—Ni alloy (permalloy). In this case, the area of the lower-core layer 1 is considerably smaller than that of the coil layer 5 and the coil layer 5 protrudes out of both sides of the lower-core layer 1 as shown in FIGS. 2 and 4. Such a small area of the lower-core layer 1 can decrease the inductance due to the lower-core layer 1.

The gap layer 2 having a given thickness is formed on the lower-core layer 1. An organic resin layer 3, composed of an ultraviolet-curing resin, such as a Novolak resin (a phenol-formaldehyde copolymer), is formed on the gap layer 2 and beside the lower-core layer 1 through a fine gap Ta. The gap layer 2 may be formed on only the lower-core layer 1 and the organic resin layer 3 may be directly formed on the upper-gap layer 14.

The organic resin layer 3 has substantially the same thickness as the lower core layer 1. The upper surface of the gap layer 2 on the lower core layer 1 and the upper surface of the organic resin layer 3a therefore are substantially present on the same plane (plane H—H) in FIG. 2. Since the organic resin layer 3a is primarily cured by ultraviolet rays, the edge 3c adjacent to the lower core layer 1 does not sag differently from thermal cure and has a small prominence. An insulating layer (resist layer) 4 composed of an organic material is formed on the lower core layer 1 and the organic core layer 3a. The insulating layer 4 barely caves in regardless of the gap between the lower core layer 1 (exactly the gap layer 2 formed on the lower core layer 1) and the organic core layer 3a because the edge 3c is not sagged. The insulating layer 4 therefore has a substantially flat upper surface as shown in FIG. 2.

The flat coil layer 5 composed of a low-resistivity material such as copper is spirally formed on the flat insulating layer 4 by a patterning process. Although the coil layer has an area larger than that of the lower core layer 1, the coil layer 5 is not affected by the edge bump and will substantially not have defects due to the flat surface of the insulating layer 4.

The coil layer 5 is covered with an insulating layer (a resist layer) 6 composed of an organic material. The upper-core layer 7 composed of a magnetic material such as permalloy is formed by plating. The upper-core layer 7 faces the lower-core layer through the gap layer 2 of the gap length G1 as shown in FIG. 1, and the base end 7b is magnetically connected to the lower-core layer 1. A protective film 8 composed of aluminum oxide or the like is formed on the upper-core layer 7.

Figure 3A:
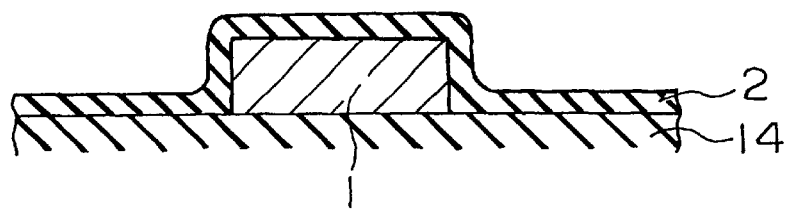
FIGS. 3A, 3B, 3C, and 3D are enlarged cross-sectional views illustrating the steps for manufacturing from a lower-core layer to a coil layer of the first combination thin film magnetic head in accordance with the present invention.
Figure 3B:
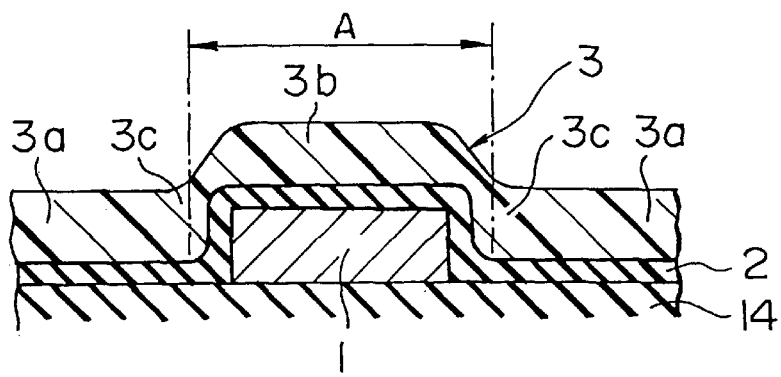

FIGS. 3A and 3B are enlarged cross-sectional views illustrating the steps for manufacturing from the lower-core layer 1 to the coil layer 5 of the combination thin/film magnetic head h2.

In FIG. 3A, the lower-core layer 1 composed of a magnetic material such as permalloy is formed on the upper-gap layer as a constituent of the reading head h1. As described above, the lower-core layer 1 has an area significantly smaller than the area of the coil layer 5. The gap layer (nonmagnetic layer) 2 composed of aluminum oxide, $SiO_2$ or the like is formed on the lower-core layer 1. The thickness of the gap layer 2 determines the gap length G1 between the lower-core layer 1 and the front end 7a of the upper-core layer 7.

In FIG. 3B, an organic resin layer 3 composed of a photosensitive ultraviolet-curing resist material, such as Novolak resin (a phenol-formaldehyde copolymer), is applied on a given region including the gap layer 2 by a spin coating process or the like, such that the thickness of the organic resin layer 3 is substantially the same as that of the lower-core layer 1. The organic resin layer 3 is subjected to pre-baking if necessary. The organic resin layer 3b in region A is exposed with a mask so as to form a gap Ta between the organic resin layer 3a and the gap layer 2. The gap Ta is determined so that the final organic resin layer 3a does not overlap with the lower-core layer 1 (exactly the gap layer 2 beside the lower-core layer 1) in view of tolerances of the position and size of the lower-core layer 1 and tolerances of mask alignment and mask formation. An adequately determined gap Ta can prevent formation of a prominence due to overlap of the organic resin layer 3a with the lower-core layer 1 during production caused by the above-mentioned tolerances.

After development the organic resin layer 3b in region A is removed, whereas the organic resin layer 3a remains near the gap layer beside the lower-core layer through the gap Ta, and a small prominence remains at the edge 3c of the organic resin layer 3a.

The organic resin layer 3a is irradiated to be cured with ultraviolet rays in the curing step and simultaneously subjected to heat treatment at a temperature of approximately 200 to 300° C. for an extremely short time period of 2 to 3 seconds in order to remove water and the solvent in the organic resin layer 3a. Since the heat treatment is auxiliary and the organic resin layer 3a is primarily cured by ultraviolet rays, the organic resin layer 3a is barely sagged at the edge 3c.

Figure 3C:
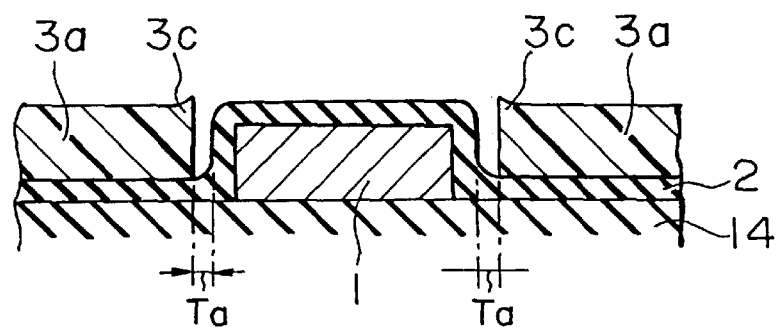
Figure 3D:
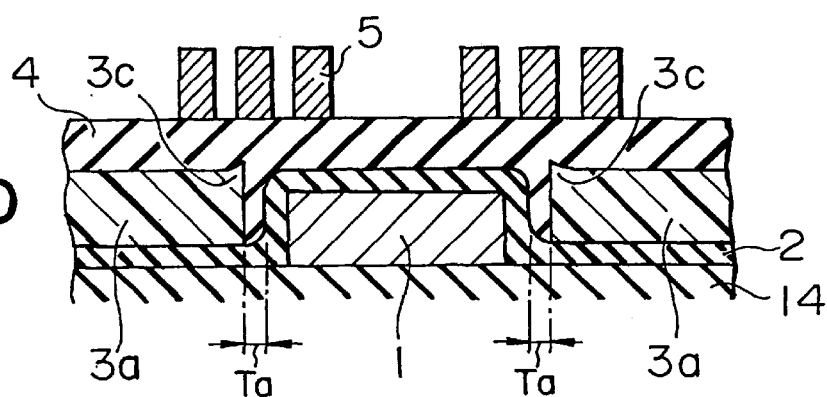

Next, as shown in FIG. 3D, the insulating layer 4 is formed on the lower-core layer and the organic resin layer 3a. The gap Ta between the lower-core layer 1 and the organic resin layer 3a is very small, the upper surface of the gap layer 2 on the lower-core layer 1 and the upper surface of the organic resin layer 3a are located on the substantially same plane, and the organic resin layer 3a is not sagged at the edge 3c. The insulating layer 4 therefore has substantially a flat surface.

A resist material is applied onto the surface of the insulating layer 4, subjected to pre-baking, exposed, developed, subjected to post-baking to form a coil pattern, and subjected to plating of a low-resistivity material such as copper to form a coil layer 5. Since the insulating layer 4 has a flat surface, patterning defects due to random scattering during exposure, which are unavoidable in conventional processes as shown in FIG. 8B, barely form during the coil patterning using the resist material. The coil layer 5 not having defects therefore is formed with high accuracy.

After forming the coil layer 5, the insulating layer 6 is formed, the upper-core layer 7 is formed by a plating process, and then the protective layer 8 is formed.

Figure 5:
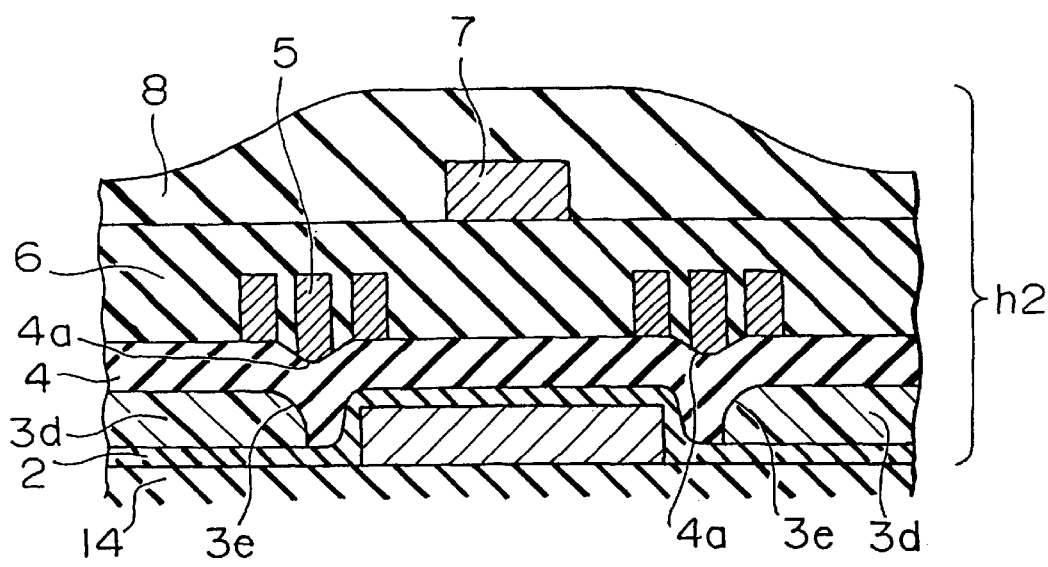
FIG. 5 is an enlarged cross-sectional view of an inductive-type magnetic head section of a second combined read/write thin film magnetic head.
Figure 6:
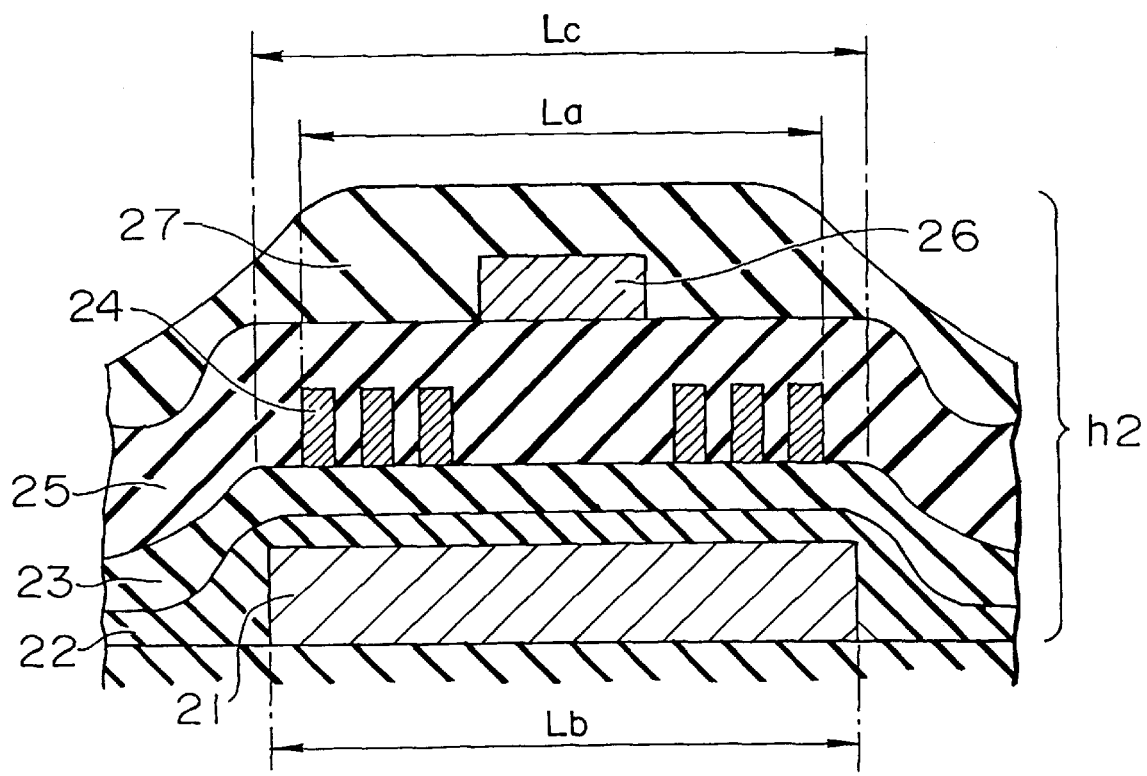
FIG. 6 is an enlarged cross-sectional view of an inductive-type magnetic head section of a first conventional combined read/write thin film magnetic head, and is taken along sectional line VI—VI of FIG. 7.
Figure 7:
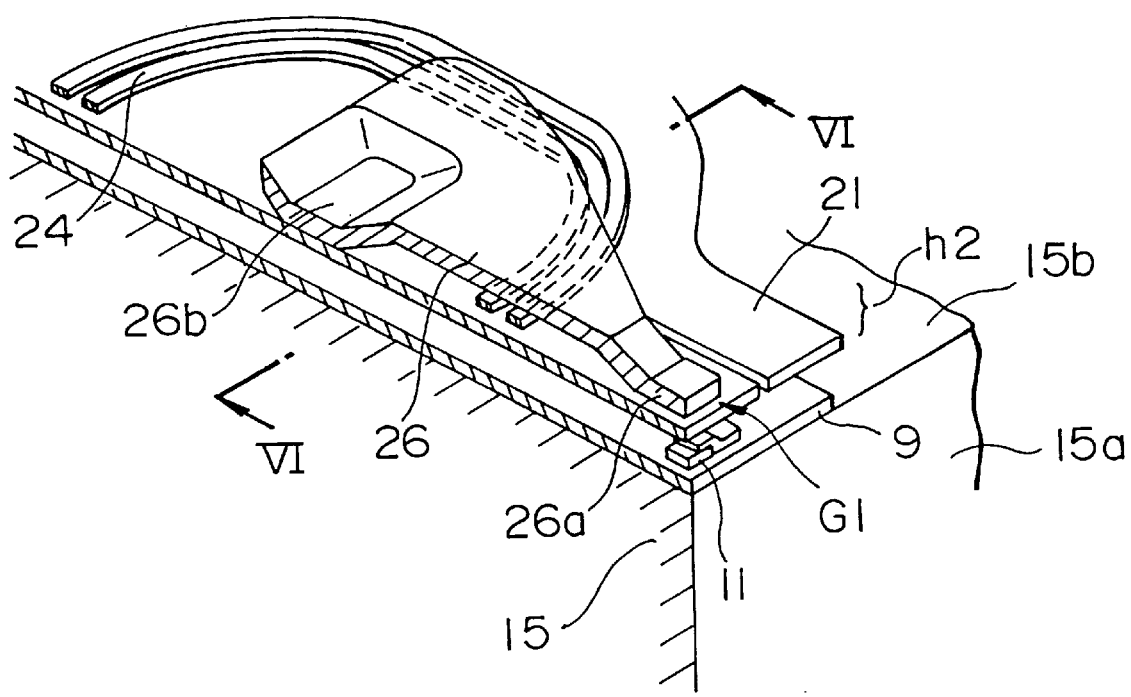
FIG. 7 is an isometric view, partly in section, of the first conventional combined read/write thin film magnetic head.

FIG. 5 is an enlarged cross-sectional view of an inductive-type magnetic head section h2 of a second combined read/write thin film magnetic head in accordance with the present invention, in which a photosensitive thermosetting organic resin layer 3d, such as a polyimide, is formed beside the lower-core layer 1 provided with the gap layer 2 thereon.

When using the photosensitive thermosetting organic resin, the resin is applied onto the gap layer 2 by a spin coating process so that the thickness of the resin layer is substantially the same as that of the lower-core layer 1, and slightly cured by a pre-baking process. The resin layer in region A is removed as shown in FIG. 3B, whereas the resin layer (insulating layer) beside the lower-core layer 1 remains as shown in FIG. 3C. The gap Ta is also provided in view of the tolerances described in the process of FIG. 3.

The resin material is cured by a post-baking process at a temperature of 200 to 300° C. for a given time period. The long-period curing process readily form sagging at the edge 3e of the organic resin layer 3d differently from the process shown in FIG. 3D. The gap between the lower core layer 1 and the organic resin layer 3d therefore is slightly increased. Thus, the insulating layer 4 formed on the lower core layer and the organic resin layer 3 has small dents or waves 4a form on the surface due to the sagging.

Figure 8A:
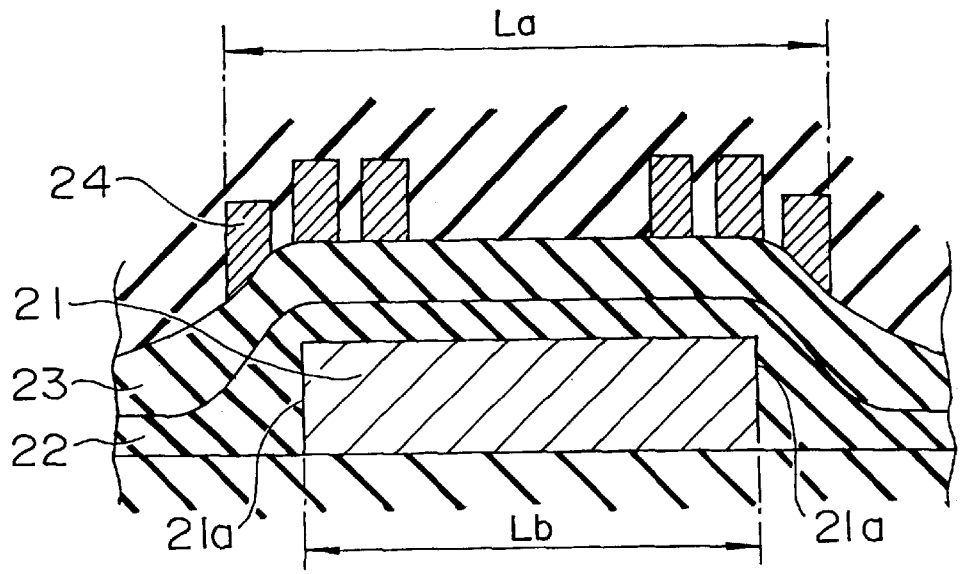
FIG. 8A is an enlarged cross-sectional view of an inductive-type magnetic head section of a second conventional combined read/write thin film magnetic head.
Figure 8B:
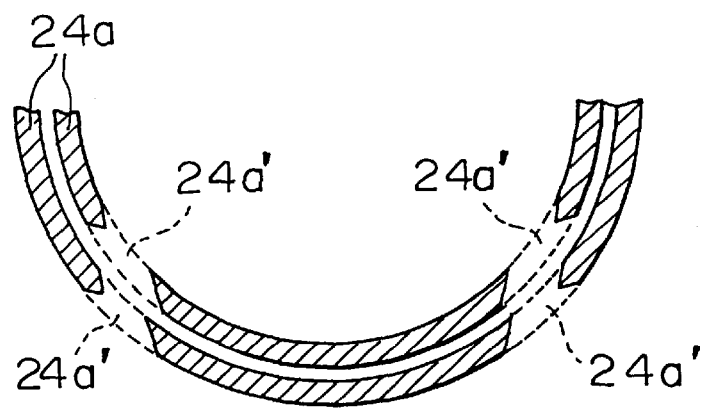
FIG. 8B is a fragmentary plan view illustrating a coil layer pattern formed with a resist layer.
Figure 9:
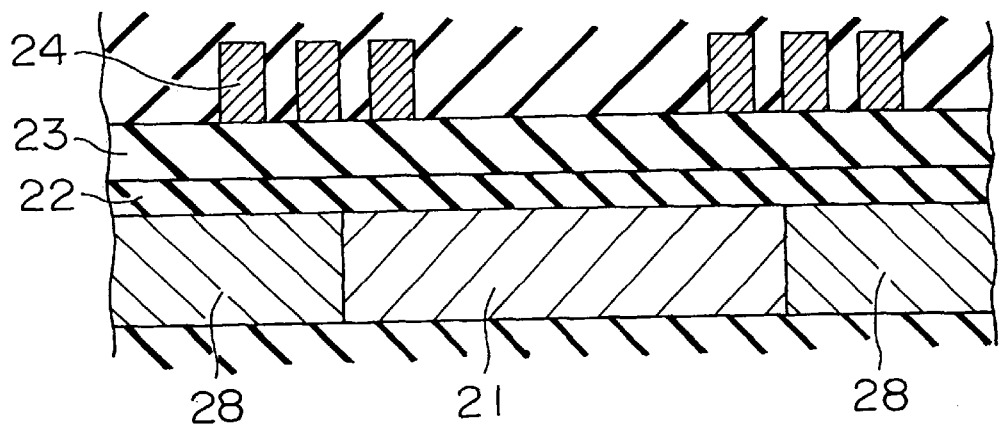
FIG. 9 is an enlarged cross-sectional view of an inductive-type magnetic head section of a third conventional combined read/write thin film magnetic head.
Figure 10A:
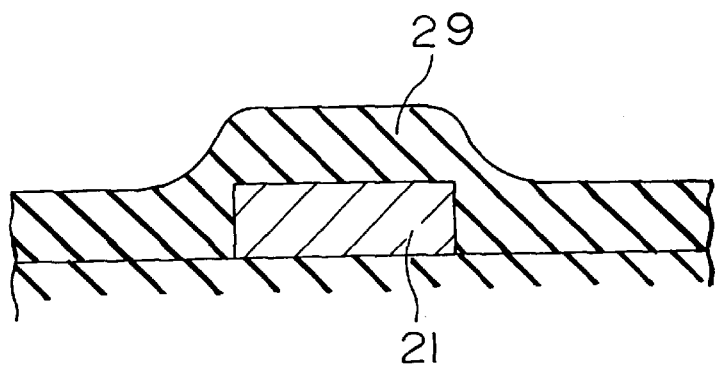
FIGS. 10A and 10B are enlarged cross-sectional views illustrating parts of steps for manufacturing a conventional combined read/write thin film magnetic head.
Figure 10B:
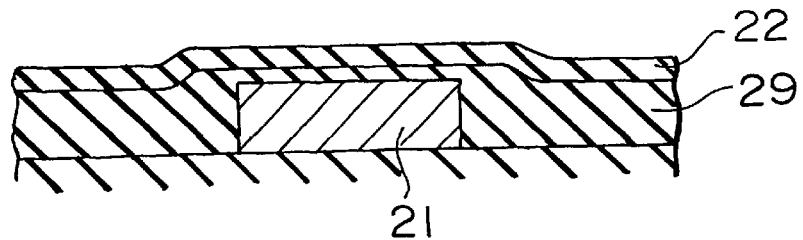

These dents or waves 4a are smaller than bumps 21a formed in conventional processes as shown in FIG. 8A and does not practically affect patterning of the coil layer 5. It is preferable that the organic resin layer 3a be formed with an ultraviolet-curing resin as shown in FIG. 3 in order to avoid formation of the dents or waves.

Sine the insulating organic resin layer 3a or 3d is used as a layer which embeds the bump at the edge of the lower-core layer, short-circuiting of the coil layer 5 will not occur even if the insulating layer 4 has pin holes or film defects.

In accordance with the present invention as described above, the impedance of the inductive-type magnetic head can be decreased by reducing the size of the lower-core layer, and high density recording characteristics can be improved in high frequency recording. The number of the coil turn can be increase, and thus the electric power consumed for recording can be reduced.

Since the organic resin layer formed beside the lower-core layer has the substantially same thickness as the lower-core layer, the formed insulating layer has a flat surface and the coil layer formed on the insulating layer can be readily formed.

Since the organic resin layer is not electrically conductive, short-circuiting between the organic resin layer and the coil layer does not occur even when pin holes form in the insulating layer.

What is claimed is:

1. A method for manufacturing a combined read/write thin film magnetic head comprising the steps of: forming a lower-core layer having a given area using a magnetic material, forming a gap layer on the lower-core layer, forming an organic resin layer on and around said lower-core layer, removing said organic resin layer overlapping with said lower-core layer, forming a first insulating layer on said lower-core layer and said organic resin layer, forming a coil layer on the region in which said lower-core layer and said organic resin layer are formed on said first insulating layer, forming a second insulating layer on said coil layer, and forming an upper-core layer on said insulating layer, one end of said upper-core layer facing said lower-core layer with an interposed nonmagnetic layer therebetween and the other end of said upper-core layer being magnetically connected to said lower-core layer, wherein said organic resin layer is formed with an ultraviolet-curing resin on and around said lower-core layer, said organic resin layer on said lower-core layer is removed by exposing and developing steps so as to form a gap between the lower-core layer and said organic resin layer, and the residual organic resin layer is cured by ultraviolet rays.

\* \* \* \* \*